United States Patent [19]

Rogers

[11] Patent Number: 4,570,657
[45] Date of Patent: Feb. 18, 1986

[54] TANK VENT VALVE
[75] Inventor: Russell L. Rogers, Munith, Mich.
[73] Assignee: Aeroquip Corporation, Jackson, Mich.
[21] Appl. No.: 631,238
[22] Filed: Jul. 16, 1984
[51] Int. Cl.⁴ ............... F16K 17/196; F16K 17/36
[52] U.S. Cl. ............................ 137/39; 137/43; 137/493
[58] Field of Search .......... 137/38, 39, 43, 493; 220/202, 203, 204

[56] References Cited

U.S. PATENT DOCUMENTS

| | | | |
|---|---|---|---|
| 1,087,890 | 2/1914 | Rogers | 137/493 X |
| 1,703,813 | 2/1929 | Carson, Jr. | |
| 1,798,536 | 3/1931 | Hoffman | 137/493 |
| 2,133,200 | 10/1938 | Kenneweg | 137/493.3 |
| 2,653,793 | 9/1953 | St. Clair | |
| 2,763,460 | 9/1956 | Epler | |
| 3,006,149 | 10/1961 | Reed | |

Primary Examiner—Robert G. Nilson
Attorney, Agent, or Firm—Beaman & Beaman

[57] ABSTRACT

A vent for a closed tank, such as a fuel tank, wherein the vent utilizes a normally closed valve, the valve being shiftable to egress and ingress venting positions by the flow of gas and air therethrough, the valve including spring counterbalanced support structure and gravity operated lock means preventing fluid loss through the vent upon the tank being tilted or overturned.

7 Claims, 2 Drawing Figures

TANK VENT VALVE

BACKGROUND OF THE INVENTION

Closed tanks or receptacles storing fluids wherein fluids are periodically introduced into the tank, or removed therefrom, often utilize vents to prevent the buildup of pressure as the tank is being filled, and facilitate removal of liquid from the tank by preventing the formation of a vaccum.

It is an object of the invention to provide a closed tank for use with fuel tanks and the like, wherein the vent is of a large capacity, yet may be readily positioned as desired by gaseous pressure due to the counterbalancing of valve structure.

A further object of the invention is to provide a tank vent employing a gas operated valve wherein counterbalancing of the valve support structure permits the valve to be displaced to an egress vent position by the rise of gas pressure within the tank, and displaced to an ingress venting position by atmospheric pressure.

A further object of the invention is to provide a vent valve of large capacity for closed tanks wherein lock structure associated with the vent valve automatically locks upon tilting of the tank associated with the valve to prevent the inadvertent loss of liquid.

Yet another object of the invention is to provide a vent for closed tanks utilizing a counterbalanced valve wherein counterbalancing is produced by a pair of compression springs.

In the practice of the invention, the vent housing is mounted within an opening formed in the top of a closed tank, such as a fuel tank. The elongated body has a substantially vertical axis and an inner port communicates with the interior of the tank, and an exterior port is exposed to the atmosphere.

A valve is interposed between the inner and outer ports, and in its normal position, seals the inner port from the outer port to prevent evaporation of the confined liquid. The valve is mounted upon support structure movable along a substantially vertical axis and the weight of the support structure and valve is counterbalanced by a pair of compression springs. Counterbalancing of the valve permits the valve to be displaced to an egress venting position as the tank is being filled due to the exiting of gas therethrough. Conversely, during removal of the liquid within the tank, the resultant lowering of tank pressure permits the atmospheric pressure acting on the valve to displace the valve inwardly venting the tank during liquid withdrawal.

A gravity operated lock is mounted upon the valve support structure which prevents displacement of the valve from its normal closed position in the event of the tank tipping or tilting sufficiently to permit liquid loss through the vent sealing the inner and outer ports. The vent lock automatically realigns and activates itself upon the tank assuming its normal substantially vertical orientation.

The counterbalancing of the valve and valve support and the use of the lock permits the vent to have high capacity capabilities during both ingress and egress venting with safety.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
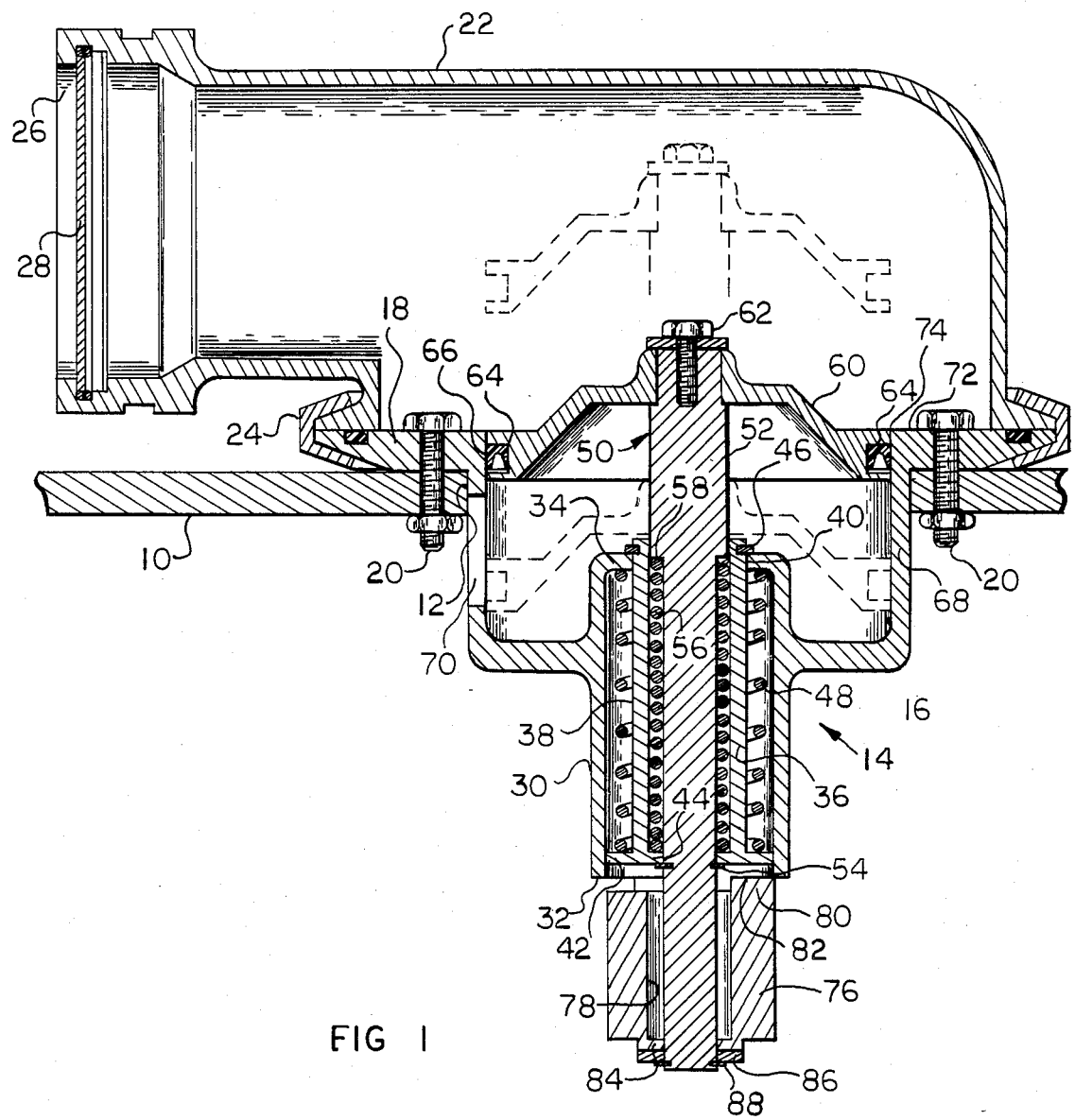
FIG. 1 is an elevational, diametrical, sectional view of an installed vent in accord with the invention illustrating the valve in dotted line positions in the egress and ingress venting conditions.

With reference to FIG. 1, the upper panel or cover of a closed tank or receptacle is represented at 10 and includes an opening 12 defined therein. The vent, generally indicated at 14, is located within the opening 12 and includes the elongated body 16 having a substantially vertically oriented axis. The body includes a radially extending flange 18 through which bolts 20 extend thereby affixing the vent body in a sealed manner with respect to the tank cover.

A housing 22 is attached to the vent body 16 at the flange 18 by a clamping ring 24, and the housing 22 includes an outlet opening 26 communicating with the atmosphere. A filter 28 located within the opening 26 prevents the entrance of foreign matter into the housing.

The body 16 includes a central tubular hub portion 30 having a lower annular edge 32, and at its upper region the hub includes a radial inwardly extending flange 34.

A tubular retainer 36 is slidably received within the hub 30 and includes a cylindrical surface 38 slidably guided within the hub by the hub opening 40. The retainer 36 includes an outer extending flange 42, and an inwardly extending flange 44 at its lower region, and a stop ring 46 is mounted within a groove at the upper region of the retainer for engaging the flange 34 as appreciated in FIG. 1. A compression spring 48 surrounds the retainer interposed between the retainer flange 42 and the hub flange 34 and imposes a downward force upon the retainer.

The valve support structure also includes an elongated valve stem 50 extending through the retainer 36 in axially displaceable relationship thereto. The stem includes a larger diameter portion 52 closely slidably received within the retainer 36, and a cylindrical opening defined in the retainer at the flange 44 encompasses the smaller diameter portion of the stem. The snap ring 54 received within a groove in the stem limits relative movement between the stem and retainer in a stem upward direction, and compression spring 56 interposed between retainer flange 44 and the stem shoulder 58 biases the stem upwardly relative to the retainer.

At its upper end, the stem 50 supports the generally circular valve 60 upon the shouldered stem end, and bolt 62 maintains the valve upon the stem.

The valve includes a circular periphery in which the seal ring 64 is mounted, and the seal ring seals against the vent body cylindrical surface 66 of body wall 68.

The body wall 68 includes at least one inner port 70 which establishes communication between the interior of the tank and the vent 14, and the intersection of the wall 68 with the flange surface 72 defines an outer vent body port 74 communicating with the interior of the housing 22 and the atmosphere. As appreciated from FIG. 1, the port 70 is vertically spaced below the port 74 such that when the valve 60 is in the position of FIG. 1, the port 70 is sealed by the valve from the port 74 and the interior of the tank does not communicate with the atmosphere within the housing 22.

At its lower and innermost region, the stem 50 is provided with an annular cylindrical lock. The lock 76 includes an internal bore 78 of a diameter significantly greater than the lower diameter of the stem 50. Extensions 80 are defined upon the lock forming abutment edges 82, and the diameter of the lock 76 is slightly less than the inner diameter of the hub portion 30 wherein the lock will fit witin the hub as the valve stem and valve are raised. The lock includes a flange 84 having an inner diameter slightly greater than the stem diameter and of limited axial dimension, and a washer 86 engages the flange 84 and snap ring 88 positions the lock at the lower end of the stem.

Figure 2:
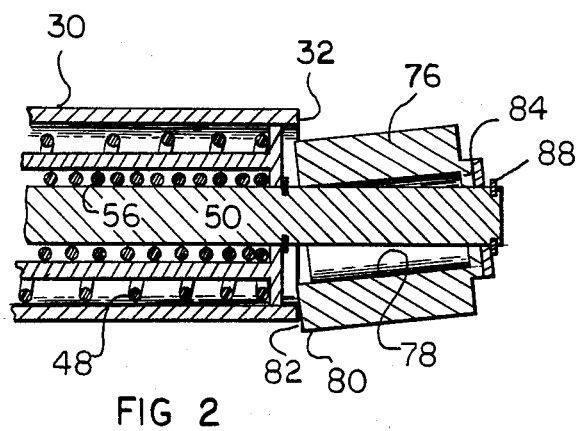
FIG. 2 is a detail, sectional view of the valve stem lock illustrated in the locking position.

The configuration of the lock is such that when the stem 50 is vertically oriented, the axis of the lock is parallel thereto and the lock is concentrically positioned on the stem. Thus, when the valve and stem rises, the lock 76 passes into the lower end of the hub without restriction. However, should the tank be tilted, gravity forces acting on the lock will tilt the lock relative to the stem aligning one of the lock edges 82 with a portion of the lower edge 32 of the hub 30 as shown in FIG. 2, and such a relationship of the components prevents outward movement of the stem and valve. Upon the stem again being vertically oriented, the lock will concentrically align itself upon the stem permitting the stem and valve to be outwardly displaceable without restraint.

Under normal operating conditions, the components will be as illustrated in FIG. 1. The spring 48 exerts a downward biasing force on the retainer 36 maintaining engagement of the ring 46 with the flange 34. The spring 56 maintains an upward biasing force upon the stem 50 maintaining engagement of the ring 54 with the flange 44. The physical characteristics of the springs are related to the weight of the stem and valve such that the stem and valve weight is substantially counterbalanced and the normal position of the valve is as shown in FIG. 1.

With the valve positioned as in FIG. 1, the interior of the tank is sealed with respect to the atmosphere preventing evaporative loss of fuel within the tank. However, upon the introduction of liquid into the tank, such as during tank filling, the slight increase of pressure within the tank will raise the valve 60 to the dotted line position shown in FIG. 1 as the valve is lifted into the housing 22.

During consumption of the fuel within the tank, the withdrawal of fuel lowers the pressure within the tank permitting the atmospheric pressure within the housing 22 to force the valve 60 downwardly as shown in the dotted line position of FIG. 1, establishing communication between ports 70 and 74 permitting atmospheric air to enter the tank to replace the withdrawn liquid. As soon as the vacuum within the tank is relieved, the valve returns to the normal position of FIG. 1.

As previously described, excessive tilting of the tank causes a tilting of the lock relative to the stem preventing outward movement of the valve through the port 74, and the lock thereby will prevent the loss of liquid through the vent during tank movement from the vertical. This feature is important when the vent is used in aircraft fuel tanks.

It is appreciated that various modifications to the inventive concepts may be apparent to those skilled in the art without departing from the spirit and scope of the invention.

I claim:

1. A normally closed vent valve for closed tanks comprising, in combination, a body having a substantially vertical axis adapted to be mounted within an opening in the top of a tank, an inner port defined in said body for communication with the tank interior, an outer port defined in said body in communication with the atmosphere, an elongated valve stem having an upper end mounted on said body for vertical movement in a direction substantially parallel to said body axis, a valve mounted on said valve stem upper end for movement therewith between normal, and egress and ingress venting positions, a valve seat defined on said body intermediate said inner and outer ports, said valve engaging said seat at its normal position sealing said inner port from said outer port and the atmosphere, a first compression spring encompassing said stem biasing said stem and valve toward said ingress vent position, a second compression spring encompassing said stem concentric with said first spring and located within said first spring biasing said stem and valve toward said egress vent position, said spring comprising counterbalance means to counterbalance the weight of said valve stem and valve whereby an increase in gaseous pressure within the tank raises said valve to said egress vent position, and a decrease in gaseous pressure within the tank lowers said valve to said ingress vent position.

2. A normally closed vent valve for closed tanks comprising, in combination, a body having a substantially vertical axis adapted to be mounted within an opening in the top of a tank, an inner port defined in said body for communication with the tank interior, an outer port defined in said body in communication with the atmosphere, a valve support mounted on said body for movement in a direction substantially parallel to said body axis, a valve mounted on said valve support for movement therewith between normal, and egress and ingress venting positions, a valve seat defined on said body intermediate said inner and outer ports, said valve engaging said seat at its normal position sealing said inner port from said outer port and the atmosphere, said valve support including counterbalance means to counterbalance the weight of said valve support and valve whereby an increase in gaseous pressure within the tank raises said valve to said egress vent position, and a decrease in gaseous pressure within the tank lowers said valve to said ingress vent position, said counterbalance means including first and second counteracting compression springs, said valve support including a tubular body portion concentric to said body axis, a tubular retainer reciprocally mounted within said body portion, said first spring surrounding said retainer and interposed between said body portion and retainer biasing said retainer downwardly, and elongated valve stem reciprocally mounted within said retainer, said valve being mounted upon said stem, said second spring surrounding said stem and interposed between said stem and retainer biasing said stem upwardly, a first stop defined on said retainer engagable with said body portion limiting downward movement of said retainer, and a second stop defined on said stem engagable with said retainer limiting upward movement of said stem relative to said retainer.

3. A normally closed vent valve for closed tanks comprising, in combination, a body having a substantially vertical axis adapted to be mounted within an opening in the top of a tank, an inner port defined in said body for communication with the tank interior, an outer port defined in said body in communication with the atmosphere, a valve support mounted on said body for movement in a direction substantially parallel to said body axis, a valve mounted on said valve support for movement therewith between normal, and egress and ingress venting positions, a valve seat defined on said body intermediate said inner and outer ports, said valve engaging said seat at its normal position sealing said inner port from said outer port and the atmosphere, said valve support including counterbalance means to counterbalance the weight of said valve support and valve whereby an increase in gaseous pressure within the tank raises said valve to said egress vent position, and a decrease in gaseous pressure within the tank lowers said valve to said ingress vent position, a gravity operated lock mounted upon said valve support, said lock being movable between a release position assumed when said body axis is substantially vertical and a locking position when said axis is displaced from the substantially vertical a predetermined extent, said locking position of said lock maintaining said valve in said normal position sealing said ports.

4. In a vent valve as in claim 3, said lock comprising a member pivotally mounted on said valve support pivotal between said release and locking positions, said lock in said locking position engaging said body.

5. A normally closed vent valve for closed tanks comprising, in combination, a body having a substantially vertical axis adapted to be mounted within an opening in the top of a tank, an inner port defined in said body for communication with the tank interior, an outer port defined in said body in communication with the atmosphere, a valve support mounted on said body for movement in a direction substantially parallel to said body axis, a valve mounted on said valve support for movement therewith between normal and egress and ingress venting positions, a valve seat defined on said body intermediate said inner and outer ports, said valve engaging said seat at its normal position sealing said inner port from said outer port and the atmosphere, a gravity operated lock mounted upon said valve support, said lock being movable between a release position assumed when said body axis is substantially vertical and a locking position when said axis is displaced from the substantially vertical a predetermined extent, said locking position of said lock maintaining said valve in said normal position sealing said ports.

6. In a vent valve as in claim 5, said lock comprising a member pivotally mounted on said valve support pivotal between said release and locking positions, said lock in said locking position engaging said body.

7. In a vent valve as in claim 6, said lock member having an abutment edge, said body having an abutment edge, said lock member edge aligning with said body abutment edge for engagement therewith when said lock member is in said lock position.

* * * * *